(12) United States Patent
Fukunaga et al.

(10) Patent No.: US 10,246,604 B2
(45) Date of Patent: Apr. 2, 2019

(54) METHOD FOR PRODUCING VINYL POLYMER-CONTAINING AQUEOUS LIQUID AND METHOD FOR PRODUCING WATER/OIL RESISTANT AGENT

(71) Applicant: AGC Inc., Chiyoda-ku (JP)

(72) Inventors: Shintaro Fukunaga, Chiyoda-ku (JP); Katsuya Ueno, Chiyoda-ku (JP); Akio Ogawa, Chiyoda-ku (JP); Yutaka Ohyama, Chiyoda-ku (JP); Teruhiko Yasuda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/664,595

(22) Filed: Jul. 31, 2017

(65) Prior Publication Data

US 2017/0327710 A1 Nov. 16, 2017

Related U.S. Application Data

(63) Continuation of application No. PCT/JP2016/055697, filed on Feb. 25, 2016.

(30) Foreign Application Priority Data

Feb. 26, 2015 (JP) ................................. 2015-036915

(51) Int. Cl.
    *C09D 133/16* (2006.01)
    *C09D 5/00* (2006.01)
    (Continued)

(52) U.S. Cl.
    CPC ............ *C09D 133/16* (2013.01); *C08F 6/008* (2013.01); *C08F 6/10* (2013.01); *C08F 214/18* (2013.01);
    (Continued)

(58) Field of Classification Search
    CPC ......... C09D 133/16; C09D 5/00; C08F 6/008; C08K 3/04; D21H 19/20; D21H 21/16; C08L 33/12
    (Continued)

(56) References Cited

U.S. PATENT DOCUMENTS

2002/0042014 A1    4/2002   Fujino et al.
2006/0241280 A1   10/2006   Katayama et al.
(Continued)

FOREIGN PATENT DOCUMENTS

EP    2 147 961 A1    1/2010
JP    2002-108013     4/2002
(Continued)

OTHER PUBLICATIONS

International Search Report dated May 31, 2016 in PCT/JP2016/055697 filed Feb. 25, 2016.

*Primary Examiner* — William K Cheung
(74) *Attorney, Agent, or Firm* — Oblon, McClelland, Maier & Neustadt, L.L.P.

(57) ABSTRACT

To provide a method for producing an aqueous liquid containing a vinyl polymer, of which the production efficiency is high, without lowering the yield of the vinyl polymer. When removing a hydrophilic organic solvent from a mixed liquid comprising a vinyl polymer, the hydrophilic organic solvent and water to produce an aqueous liquid containing the vinyl polymer, a liquid phase and a gas phase are formed in a closed container, a part of the liquid of the liquid phase is formed into small droplets and brought into contact with the gas phase to vaporize the hydrophilic organic solvent, and the vaporized hydrophilic organic solvent is removed from the closed container. Specifically, for example, a closed container 10 having a liquid inlet 22, a gas outlet 30, a liquid outlet 21, a liquid inlet 22 and a liquid outlet 21 which are connected and having an external
(Continued)

circulating system provided with means to control the temperature and the pressure of liquid, is filled with a mixed liquid 40 to form a liquid phase 50 and a gas phase 51, the mixed liquid 40 of the liquid phase 50 is circulated from the liquid outlet 21 to the external circulating system 20, and the temperature and the pressure of the mixed liquid 41 in the external circulating system 20 are controlled to conditions such that the hydrophilic organic solvent is easily vaporized in liquid droplets in the gas phase 51, followed by discharging the mixed liquid 41 in the form of the small droplets from the liquid inlet 22 to the gas phase 51 and draining the gas in the gas phase 51 from the gas outlet 30.

15 Claims, 1 Drawing Sheet

(51) Int. Cl.

| | | |
|---|---|---|
| *D21H 19/20* | (2006.01) | |
| *D21H 21/16* | (2006.01) | |
| *C08F 214/18* | (2006.01) | |
| *C08F 220/24* | (2006.01) | |
| *C08F 6/10* | (2006.01) | |
| *C08K 3/04* | (2006.01) | |
| *C08F 6/00* | (2006.01) | |

(52) U.S. Cl.
CPC .............. *C08F 220/24* (2013.01); *C08K 3/04* (2013.01); *C09D 5/00* (2013.01); *D21H 19/20* (2013.01); *D21H 21/16* (2013.01)

(58) Field of Classification Search
USPC ........................................................ 524/805
See application file for complete search history.

(56) References Cited

U.S. PATENT DOCUMENTS

| | | |
|---|---|---|
| 2012/0225300 A1 | 9/2012 | Kawana et al. |
| 2014/0162064 A1* | 6/2014 | Dikan ...................... C08K 3/04 |
| | | 428/402 |
| 2015/0191874 A1 | 7/2015 | Kawana et al. |

FOREIGN PATENT DOCUMENTS

| | | |
|---|---|---|
| JP | 2005-29765 | 2/2005 |
| JP | 2007-77221 | 3/2007 |
| WO | WO 2005/090423 A1 | 9/2005 |
| WO | WO 2006/008902 A1 | 1/2006 |
| WO | WO 2009/145234 A1 | 12/2009 |
| WO | WO 2011/059039 A1 | 5/2011 |

\* cited by examiner

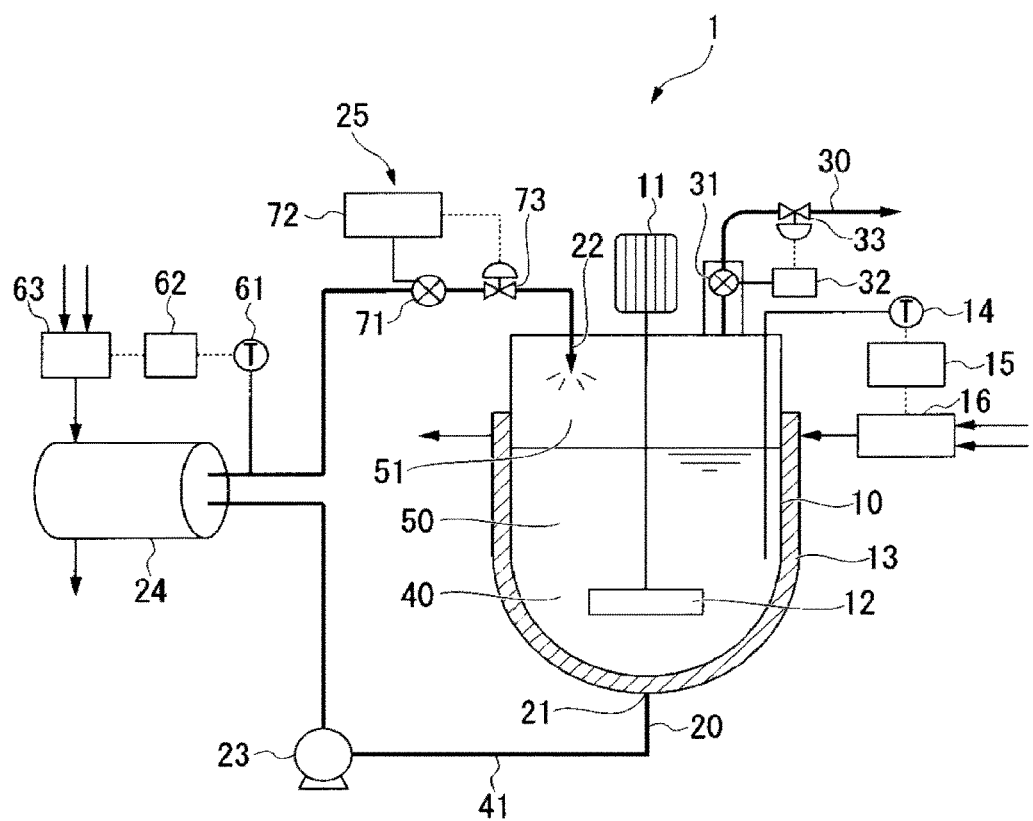

METHOD FOR PRODUCING VINYL POLYMER-CONTAINING AQUEOUS LIQUID AND METHOD FOR PRODUCING WATER/OIL RESISTANT AGENT

This application is a continuation application of PCT International Application No. PCT/JP2016/055697filed on Feb. 25, 2016, which claims the benefit under 35U.S.C. Section 119(a) to Patent Application No. JP2015-036915, filed in Japan on Feb. 26, 2015. All of the above applications are hereby expressly incorporated by reference into the present application.

TECHNICAL FIELD

The present invention relates to a method for producing an aqueous liquid containing a vinyl polymer and a method for producing a water/oil resistant agent.

BACKGROUND ART

Water/oil resistant paper is sometimes used as a wrapping material for food products, such as wrapping paper for food products or a packaging container for food products. The water/oil resistant paper is produced by applying a water/oil resistant agent on a substrate such as paper or by treatment such as addition of the water/oil resistant agent to a pulp slurry.

For example, some water/oil resistant agents contain a polymer. As the polymer, a vinyl polymer having hydrophobic groups and hydrophilic groups as pendant groups is widely used, since such a vinyl polymer has water/oil resistant property and is excellent in solubility and dispersibility in water.

An organic solvent is usually used as a polymerization solvent for producing the vinyl polymer. In order to use the vinyl polymer as raw material for the water/oil resistant agent in the application for food products, it is necessary to remove an organic solvent from an organic solvent solution after the polymerization so as to be a water dispersion.

As the method for removing an organic solvent from a vinyl polymer dispersion containing the organic solvent and water, a method has been known that the dispersion is heated from the outside of a closed container by a jacket, whereby the organic solvent is evaporated and removed. For example, in Patent Document 1 at Examples 1 to 3, the outside of a reaction container is heated by jacket at from 50 to 65° C. under the condition of reduced pressure, whereby the inside of a closed container is heated to remove acetone.

PRIOR ART DOCUMENTS

Patent Documents

Patent Document 1: WO2011/059039
Patent Document 2: WO2005/090423
Patent Document 3: WO2009/145234

DISCLOSURE OF INVENTION

Technical Problem

However, there is a problem that bubbles are likely to be generated, since a vinyl polymer has hydrophobic groups and hydrophilic groups, and in the case of the above described method, bubbles derived from the vinyl polymer are removed together with the organic solvent, which causes the deterioration of the yield of the vinyl polymer. Further, if heating is carried out under a mild condition in order to suppress the generation of bubbles, it takes long time for removing an organic solvent, and thereby the production efficiency is low.

Thus, it is an object of the present invention to provide a method for producing a vinyl polymer-containing aqueous liquid with the high production efficiency, without lowering the yield of the vinyl polymer.

Solution to Problem

The present invention is the following [1] to [15].

[1] A method for producing an aqueous liquid containing a vinyl polymer, which comprises filling a closed container having a gas outlet with a mixed liquid containing water and a hydrophilic organic solvent with a boiling point of lower than 100° C., wherein a vinyl polymer having hydrophobic groups and hydrophilic groups is dissolved or dispersed, to form a liquid phase and a gas phase, then forming a part of the liquid of the liquid phase into small droplets and bringing the small droplets into contact with the gas phase to vaporize the hydrophilic organic solvent in the small droplets and removing the gas of the gas phase containing the vaporized hydrophilic organic solvent from the gas outlet of the closed container, whereby the amount of the hydrophilic organic solvent in the liquid phase is reduced to at most 1 mass % per the total amount of the hydrophilic organic solvent and water.

[2] The production method according to [1], wherein the closed container has a circulating system to take out a part of the liquid of the liquid phase and control the temperature of the taken out liquid to form it into small droplets and to discharge them in the gas phase.

[3] The production method according to [2], wherein the closed container has a liquid outlet to discharge the liquid of the liquid phase and a liquid inlet to introduce the liquid to the gas phase, the circulating system is an external circulating system formed between the liquid outlet and the liquid inlet, and the external circulating system has a means to control the temperature and the pressure of the liquid flowing therein.

[4] The production method according to any one of [1] to [3], wherein the pressure of the gas phase is at most atmospheric pressure, the temperature of the liquid of the liquid phase is lower than the boiling point of water in the gas phase, and the temperature of the liquid to be formed into small droplets and brought into contact with the gas phase is at least the boiling point of the hydrophilic organic solvent and lower than the boiling point of water.

[5] The production method according to any one of [1] to [4], wherein the amount of water in the mixed liquid is at least 50 mass % per the total amount of water and the hydrophilic organic solvent, and in a case where water and the hydrophilic organic solvent have an azeotropic point, the amount of water is water excessive than the azeotropic composition.

[6] The production method according to any one of [1] to [5], wherein the temperature of the liquid of the liquid phase is maintained to be substantially constant, and the removal of the hydrophilic organic solvent is continued, while reducing the pressure of the gas phase in accordance with the change of the composition of water and the hydrophilic organic solvent.

[7] The production method according to any one of [2] to [5], wherein the pressure of the gas phase is maintained to be substantially constant, and the removal of the hydrophilic organic solvent is continued, while increasing the temperature of the liquid in the circulating system in accordance with the change of the composition of water and the hydrophilic organic solvent.

[8] The production method according to any one of [1] to [7], wherein the hydrophilic organic solvent is acetone, methyl ethyl ketone or 2-propanol.

[9] The production method according to any one of [1] to [8], wherein the hydrophobic groups are polyfluoroalkyl groups.

[10] The production method according to any one of [1] to [9], wherein the hydrophilic groups are acidic groups or basic groups.

[11] The production method according to any one of [1] to [9], wherein the hydrophilic groups are neutralized acidic groups or neutralized basic groups.

[12] The production method according to [11], wherein the mixed liquid is a mixed liquid which comprises an aqueous solution containing a basic substance, and a hydrophilic organic solvent solution containing a vinyl polymer obtained by copolymerizing in a hydrophilic organic solution, a vinyl monomer mixture containing a vinyl monomer having a carboxyl group and a vinyl monomer having a polyfluoroalkyl group.

[13] The production method according to [11], wherein the mixed liquid is a mixed liquid which comprises an aqueous solution containing an acidic substance, and a hydrophilic organic solvent solution containing a vinyl polymer obtained by copolymerizing in a hydrophilic organic solvent, a vinyl monomer mixture containing a vinyl monomer having a dialkyl amino group and a vinyl monomer having a polyfluoroalkyl group.

[14] A method for producing a water/oil resistant agent, which comprises producing the vinyl polymer aqueous liquid by the production method as defined in any one of [1] to [13] and preparing a water/oil resistant agent from the aqueous liquid.

[15] A method for producing a water/oil resistant substrate, which comprises treating a substrate with the water/oil resistant agent obtained by the production method as defined in [14].

Advantageous Effects of Invention

According to the present invention, the yield of the vinyl polymer is high, whereby it is possible to provide a method for producing a vinyl polymer-containing aqueous liquid, of which the production efficiency is excellent.

BRIEF DESCRIPTION OF DRAWINGS

FIGURE: schematic view illustrating one example of an apparatus for producing a vinyl polymer-containing aqueous liquid, which is used in the production method of the present invention.

BRIEF DESCRIPTION OF EMBODIMENTS (Vinyl Polymer)

The vinyl polymer in the present invention is a polymer having hydrophobic groups and hydrophilic groups as pendant groups. Further, hereinafter, "polymer having hydrophobic groups and hydrophilic groups" is referred to as "vinyl polymer A", and "aqueous liquid containing a vinyl polymer A" is simply referred to also as "aqueous liquid".

The vinyl polymer A is a polymer having units derived from a monomer having a hydrophobic group (hereinafter referred to as "monomer (a)") and units derived from a monomer having a basic group or an acidic group (hereinafter referred to as "monomer (b)") or a derivative of the polymer. The derivative is a polymer having neutralized acidic groups or neutralized basic groups which is obtained by neutralizing acidic groups or basic groups of the polymer. Further, hereinafter, both neutralized acid groups and neutralized basic groups are referred to as "neutralized groups".

In the present invention, the hydrophilic group in the vinyl polymer A is any one of the above acidic group, basic group and neutralized group. The vinyl polymer A may have two or more types of hydrophilic groups.

By neutralizing the vinyl polymer A having acidic groups or basic groups with an acidic substance or a basic substance, some or all of the acidic groups or the basic groups become neutralized groups, whereby the solubility or the dispersibility of the vinyl polymer A in water or a hydrophilic organic solvent will improve. Accordingly, the vinyl polymer A in the present invention is preferably a vinyl polymer having neutralized groups.

(Monomer (a))

The monomer (a) is a monomer having a hydrophobic group.

The hydrophobic group is preferably a long chain alkyl group or a polyfluoroalkyl group.

The long chain alkyl group is preferably a $C_{8-24}$ long chain alkyl group or a branched alkyl group having a short branch and having a carbon number of the long chain part of from 10 to 26.

The polyfluoroalkyl group is preferably a polyfluoroalkyl group of which at least 50% of the number of hydrogen atoms in the alkyl group is replaced by fluorine atoms, particularly preferably a polyfluoroalkyl group of which from 75 to 100% of the number of hydrogen atoms in the alkyl group is replaced by fluorine atoms. Further, hereinafter, a polyfluoroalkyl group of which all hydrogen atoms are replaced by fluorine atoms is referred to also as "perfluoroalkyl group". The polyfluoroalkyl group is preferably a perfluoroalkyl group or a polyfluoroalkyl group having a perfluoroalkyl group moiety. The carbon number of the polyfluoroalkyl group is preferably from 1 to 10. The carbon number of the perfluoroalkyl group is preferably from 1 to 6.

In a case where the monomer (a) is an alcohol derivative having a hydrophobic group such as methacrylate, the hydrophobic group is preferably a group represented by $R^F$—$R^1$—. Here, $R^F$ is a $C_{2-6}$ perfluoroalkyl group, and $R^1$ is a $C_{2-4}$ alkylene group.

The monomer (a) is particularly preferably an acrylate having $R^F$—$R^1$—, a methacrylate or an acrylate of which an a position is replaced by a chlorine atom.

As specific examples of the monomer (a), the following compounds may be mentioned.

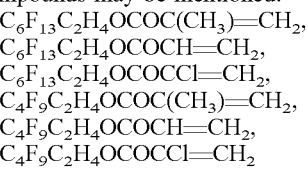

(Monomer (b))

The monomer (b) is a monomer having a basic group or an acidic group.

The acidic group may, for example, be a carboxy group, a phosphoric acid group or a sulfonic acid group, and the basic group may, for example, be a primary amino group, a secondary amino group or a tertiary amino group. Further, the secondary amino group is preferably a monoalkyl amino group, the tertiary amino group is preferably a dialkyl amino group, and the alkyl groups in the monoalkyl amino group and the dialkyl amino group are preferably an alkyl group having at most 4 carbon atoms respectively.

As the monomer (b), a monomer having a basic group (such as a tertiary amino group) to be easily neutralized with an acidic substance such as acetic acid and to be formed into a salt or having an acidic group (such as a carboxy group) to be easily neutralized with a basic substance such as sodium hydroxide and to be formed into a salt is preferably used. A hydrophilic organic solvent solution of a vinyl polymer A having units derived from such a monomer (b) is mixed with water containing an acidic substance or a basic substance to neutralized some or all of the acidic groups or the basic groups in the vinyl polymer A, whereby a mixture of the hydrophilic organic solvent containing the vinyl polymer A having neutralized groups and water can be obtained.

As preferred examples of the monomer (b), an acrylate having a carboxy group or a dialkyl amino group, a methacrylate having a carboxy group or a dialkyl amino group, an unsaturated monocarboxylic acid and an unsaturated polycarboxylic acid may be mentioned. The monomer (b) is particularly preferably an acrylate having a carboxy group or a dialkyl amino group, a methacrylate having a carboxy group or a dialkyl amino group, an unsaturated monocarboxylic acid or an unsaturated polycarboxylic acid.

The monomer (b) is preferably an ester of an alcohol having a group represented by X—$R^2$— and an unsaturated carboxylic acid such as a methacrylic acid. Here, X is a carboxy group or a tertiary amino group, and $R^2$ is a $C_{1-6}$ alkylene group.

In a case where the monomer (b) is an unsaturated monocarboxylic acid or an unsaturated dicarboxylic acid, the compound represented by the following formula is preferred:

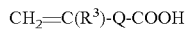

$CH_2=C(R^3)$-Q-COOH wherein $R^3$ is a hydrogen atom, a halogen atom, a $C_{1-3}$ alkyl group or a carboxy group, and Q is a $C_{1-6}$ alkylene group.

As the monomer (b), the following compounds are preferred.

Here, regarding the name of the compound mentioned below, "(meth)acrylate" is used to represent an acrylate and a methacrylate. The same applies to the after mentioned monomer (c).

N,N-dimethylaminoethyl (meth)acrylate, N,N-diethylaminoethyl (meth)acrylate, N,N-dimethylaminopropyl (meth)acrylate, N,N-diisopropylaminoethyl (meth)acrylate, N,N-dimethylaminopropyl (meth)acrylamide, N,N-dimethylaminooxideethyl (meth)acrylate, acrylic acid, methacrylic acid and itaconic acid.

(Another Monomer)

As a case requires, the vinyl polymer A used in the present invention may have units derived from a monomer other than monomer (a) and the monomer (b). Hereinafter, the monomer other than the monomer (a) and the monomer (b) is referred to as "monomer (c)".

The monomer (c) may, for example, be an acrylate, a methacrylate, an olefin, a halogenated olefin, an unsaturated ether, an unsaturated alcohol ester, an acrylamide or a methacrylamide.

The monomer (c) is preferably a monomer having a crosslinkable functional group, a monomer having a hydroxy group or a monomer having a polyoxyalkylene chain. When used as the water/oil resistant agent, the vinyl polymer A having crosslinkable groups, hydroxy groups or polyoxyalkylene chains is applied on a substrate, and the substrate is subjected to heat treatment to crosslink the vinyl polymer A, whereby physical properties of the treated substrate such as the durability will improve. The crosslinkable functional groups may, for example, be blocked isocyanate groups or N-methylol groups.

As the monomer (c), the following compounds may, for example, be mentioned.

Ethylene, vinylidene chloride, vinyl chloride, vinylidene fluoride, vinyl acetate, vinyl propionate, vinyl isobutanate, vinyl isodecanate, vinyl stearate, cetyl vinyl ether, dodecyl vinyl ether, isobutyl vinyl ether, ethyl vinyl ether, 2-chloroethyl vinyl ether, styrene, α-methyl styrene, p-methyl styrene, (meth)acrylamide, diacetone (meth)acrylamide, methylolated diacetone (meth)acrylamide, vinyl alkyl ketone, butadiene, isoprene, chloroprene, benzyl (meth)acrylate, (meth)acrylate having a polysiloxane, allyl acetate, N-vinylcarbazol, maleimide, N-methylmaleimide, glycidyl (meth)acrylate, N-methylol (meth)acrylamide, N-methoxymethyl (meth)acrylamide, N-ethoxymethyl (meth)acrylamide and N-butoxymethyl (meth)acrylamide.

A 2-butanoneoxime adduct of 2-isocyanate ethyl (meth)acrylate, a pyrazole adduct of 2-isocyanate ethyl (meth)acrylate, a 3,5-dimethylpyrazole adduct of 2-isocyanate ethyl (meth)acrylate, a 3-methylpyrazole adduct of 2-isocyanate ethyl (meth)acrylate, an ε-caprolactam adduct of 2-isocyanate ethyl (meth)acrylate, a 2-butanoneoxime adduct of 3-isocyanate propyl (meth)acrylate, a pyrazole adduct of 3-isocyanate propyl (meth)acrylate, a 3,5-dimethylpyrazole adduct of 3-isocyanate propyl (meth)acrylate, a 3-methylpyrazole adduct of 3-isocyanate propyl (meth)acrylate, an ε-caprolactam adduct of 3-isocyanate propyl (meth)acrylate, a 2-butanoneoxime adduct of 4-isocyanate butyl (meth)acrylate, a pyrazole adduct of 4-isocyanate butyl (meth)acrylate, a 3,5-dimethylpyrazole adduct of 4-isocyanate butyl (meth)acrylate, a 3-methylpyrazole adduct of 4-isocyanate butyl (meth)acrylate, and an ε-caprolactam adduct of 4-isocyanate butyl (meth)acrylate.

2-Hydroxyethyl (meth)acrylate, 2-hydroxypropyl (meth)acrylate, 2-hydroxybutyl (meth)acrylate, 4-hydroxybutyl (meth)acrylate, polyoxyethylene glycol mono(meth)acrylate, polyoxypropylene glycol mono(meth)acrylate, poly(oxypropylene-oxytetramethylene) glycol monomethacrylate, methoxypolyoxyethylene glycol (meth)acrylate and triethylene glycol di(meth)acrylate.

As specific examples of the vinyl polymer, fluorinated copolymers mentioned in WO2011/059039 (Patent Document 1), WO2005/090423 (Patent Document 2), WO2009/145234 (Patent Document 3) and WO2009/57716 may, for example, be mentioned.

The vinyl polymer A used in the present invention has hydrophobic groups and hydrophilic groups as pendant groups and thereby bubbles are easily generated.

(Hydrophilic Organic Solvent)

A hydrophilic organic solvent is used as a solvent for the polymerization reaction at the time of preparing a vinyl polymer A, whereby a liquid having the vinyl polymer A having acidic groups or basic groups dissolved or dispersed in the hydrophilic organic solvent can be obtained. In the present invention, water is added to such a liquid to prepare a mixed liquid wherein the vinyl polymer A having acidic groups or basic groups is dissolved or dispersed in water and the hydrophilic organic solvent (hereinafter, "liquid containing water and a hydrophilic organic solvent" is referred to as "water type medium".). In the case of the vinyl polymer A having neutralized groups, an aqueous liquid containing an acidic substance or a basic substance is added to a liquid having the polymer A having acidic groups or basic groups dissolved or dispersed in a hydrophilic organic solvent to prepare a mixed liquid wherein the vinyl polymer A having neutralized groups is dissolved or dispersed in an aqueous medium.

The hydrophilic organic solvent in the present invention is one having a boiling point lower than the boiling point of water (100° C.) under the normal pressure (101,325 Pa) in which the vinyl polymer A can be easily dissolved or dispersed so as to easily remove only the hydrophilic organic solvent after the polymerization.

As the hydrophilic organic solvent, the followings may be mentioned. The temperature in the parenthesis is a boiling point under the normal pressure.

A ketone such as acetone (56.5° C.) or methyl ethyl ketone (79.5° C.), an alcohol such as methanol (64.7° C.), ethanol (78.4° C.) or 2-propanol (82.4° C.), an ester such as ethyl acetate (77.1° C.), an ether such as diisopropyl ether (69° C.) or tetrahydrofuran (66° C.) or a mixture thereof. From the viewpoint of the handling efficiency, acetone, methyl ethyl ketone or 2-propanol is preferred.

(Mixed Liquid)

The mixed liquid in the present invention is a liquid wherein the vinyl polymer A is dissolved or dispersed in a water type solvent. The mixed liquid may contain another component.

Such another component may, for example, be an acidic substance or a basic substance which is used for neutralizing acidic groups or basic groups and remains as unreacted material.

As specific example of the acidic substance, hydrochloric acid, hydrobromic acid, nitric acid, phosphoric acid, propionic acid, acetic acid, maleic acid, itaconic acid, lactic acid, citric acid, tartaric acid, succinic acid, fumaric acid and formic acid may be mentioned.

As specific examples of the basic substance, basic substances such as sodium hydroxide, potassium hydroxide, ammonia, trimethylamine, ethanolamine, diethanolamine, triethanolamine, 2-amino-2-methyl-1-propanol, 2-amino-2-methyl-1,3-propanediol, 2-amino-2-hydroxymethyl-1,3-propanediol, bis(hydroxymethyl)aminomethane and tris(hydroxymethyl)aminomethane may be mentioned.

The amount of water in the mixed liquid is preferably at least 50 mass %, per the total amount of water and the hydrophilic organic solvent. When the amount of water is at least 50 mass %, the concentration of the vinyl polymer A in the aqueous liquid after removing the hydrophilic organic solvent will not be excessively high, and thereby a stable aqueous liquid will be obtained. A part of water is discharged from the system together with the hydrophilic organic solvent at the time of removing the hydrophilic organic solvent, and thereby the amount of water at the time of first preparing a mixed liquid, is required to be larger than the amount of water in an aqueous liquid to be obtained. Further, in a case where the amount of water is at least 50 mass %, and water and the hydrophilic organic solvent have an azeotropic point, the amount of water to be discharged with the hydrophilic organic solvent tends to be excessive at the azeotropic point, and thereby the amount of water at the time of first preparing a mixed liquid is preferably water excessive amount than the azeotropic composition.

(Aqueous Liquid)

The hydrophilic organic solvent is removed from the above mixed liquid by the method of the present invention to obtain an aqueous liquid having the vinyl polymer A dissolved or dispersed in water. The content of the hydrophilic organic solvent in the aqueous liquid is at most 1 mass %, preferably at most 0.1 mass %, per the total amount (100 mass %) of the hydrophilic organic solvent and water in the aqueous liquid.

The concentration of the vinyl polymer A in the aqueous liquid is preferably from 1 to 50 mass %.

(Water/Oil Resistant Agent)

The water/oil resistant agent produced by the production method of the present invention contains an aqueous liquid and as a case requires, an additive.

The water/oil resistant agent produced by the production method of the present invention may be one obtained by further diluting aqueous liquid with water. The solid content concentration of the vinyl polymer A in the water/oil resistant agent is preferably from 1 to 40 mass %, more preferably from 10 to 39 mass %, most preferably from 15 to 35 mass %. When the solid content concentration of the vinyl polymer A falls within the above range, the vinyl polymer A can be prevented from gelating and precipitating. Further, a substrate can be efficiently treated with the water/oil resistant agent.

(Additive)

The additive to be contained in the water/oil resistant agent may, for example, be a paper strength enhancing agent, a defoaming agent, a sizing agent, a chelating agent, a coagulating agent, a retention agent, a pigment, a dye, a pH adjusting agent, a binder, an acid or an alkali.

(Method for Producing Aqueous Liquid)

The method for producing an aqueous liquid of the present invention comprises filling a closed container having a gas outlet with a mixed liquid containing a hydrophilic organic solvent and water wherein a vinyl polymer A is dissolved or dispersed to form a liquid phase and a gas phase, then forming a part of the liquid of the liquid phase into small droplets and bring the small droplets into contact with the gas phase to vaporize the hydrophilic organic solvent in the small droplets and removing the gas of the gas phase containing the vaporized hydrophilic organic solvent from the gas outlet of the closed container, whereby the amount of the hydrophilic organic solvent in the liquid phase is reduced to at most 1 mass % per the total amount of the hydrophilic organic solvent and water.

It is preferred to provide the internal part or the external part of the closed container with a circulating system to circulate the liquid of the liquid phase, to remove a part of the liquid of the liquid phase by the circulating system, to control the temperature of the liquid to form it into small droplets and to discharge them into the gas phase, in order that a part of the liquid of the liquid phase is formed into the small droplets and brought into contact with the gas phase. Particularly, it is more preferred to provide the closed container with a liquid outlet to discharge the liquid of the liquid phase and a liquid inlet to introduce the liquid to the gas phase, and the circulating system is preferably an external circulating system formed between the liquid outlet and the liquid inlet, and the external circulating system preferably has a means to control the temperature and the pressure of the liquid flowing therein. By controlling the temperature and the pressure of the liquid in the circulating system to conditions such that the hydrophilic organic solvent easily evaporates, the hydrophilic organic solvent can be more efficiently removed.

Further, in the present specification, "small droplets" are liquid droplets having a particle size of at most 1,000 μm.

As one example of the method for producing an aqueous liquid of the present invention, the method using the aqueous liquid-production apparatus illustrated in FIG. 1 will be described. The aqueous liquid-production apparatus 1 illustrated in FIG. 1 is one example of a closed container having the above described external circulating system.

The closed container 10 is filled with a mixed liquid 40, and a liquid phase 50 and a gas phase 51 are formed. The closed container 10 has a liquid outlet 21 to discharge the liquid of the liquid phase and a liquid inlet 22 to introduce the liquid to the gas phase, and the liquid outlet 21 and the liquid inlet 22 are connected to form an external circulating system 20. A part of the liquid of the liquid phase 50 in the closed container 50 (hereinafter, "a part of the liquid of the liquid phase 50 discharged from the liquid outlet 21" is also referred to as "mixed liquid 41".) is discharged from the liquid outlet 21 by a circulating pump 23 and circulated in the external circulating system 20 and in the closed container 10. Further, the external circulating system 20 has a means to control the temperature and the pressure of the mixed liquid 41. The temperature of the mixed liquid 41 in the external circulating system 20 is controlled by a heat exchanger 24. The temperature of the mixed liquid 41 at the vicinity of an exit of the heat exchanger 24 is measured by a thermometer 61, and the flow rate of water and steam in the heat exchanger 24 is controlled by a temperature controlling device 62 and a mixer 63 to control the temperature of the mixed liquid 41. The pressure of the mixed liquid 41 in the external circulating system 20 is controlled by a pressure controlling means 25. The pressure in the external circulating system 20 is measured by a pressure gauge 71, and the pressure in the external circulating system 20 is controlling by a pressure controlling device 72 and a pressure controlling valve 73. The temperature and/or the pressure of the mixed liquid 41 in the external circulating system is controlled so that the mixed liquid 41 would be easily vaporized in the gas phase 51 in the closed container 10, and the mixed liquid is discharged in the form of small droplets from the liquid inlet 22 to the gas phase 51.

The gas outlet 30 is installed at an upper part of the closed container 10. The gas phase 51 in the closed container 10 is discharge from the gas outlet 30 by a vacuum pump (not illustrated) installed at a downstream side of the gas outlet 30. The pressure at the vicinity of the inlet of the gas outlet 30 is measured by a pressure gauge 31, and the pressure in the gas outlet 30 is controlled by a pressure controlling device 32 and a pressure controlling valve 33. Further, the gas discharge from the gas outlet 30 is recovered by a collector (not illustrated).

The closed container 10 is provided with a jacket heater 13 to control the temperature of the liquid phase 50. The temperature of the liquid phase 50 is measured by a thermometer 14, and the flow rate of water and steam in the jacket heater 13 is controlled by a temperature controlling device 15 and a mixer 16 to control the temperature of the liquid phase 50.

The closed container 10 is provided with a stirrer 12 to stir the liquid phase 50 and a power motor 11 to rotate the stirrer.

A known one may be appropriately selected and used as each construction in the aqueous liquid-production apparatus 1.

The amount of water in the mixed liquid 40 to be filled in the closed container 10 is at least 50 mass %, per the total amount of water and the hydrophilic organic solvent. Here, in a case where a hydrophilic organic solvent having an azeotropic point with water is used, it is necessary to control the amount of water so that water and the hydrophilic organic solvent would not be an azeotropic composition. The amount of water is preferably a water excessive amount more than the azeotropic composition.

The pressure in the closed container 10 is controlled by the pressure gauge 31, the pressure controlling device 32 and the pressure controlling valve 33, while discharging the gas phase 51 in the closed container 10 by a vacuum pump. The pressure of the gas phase 51 in the closed container 10 is preferably at most the atmospheric pressure, more preferably from 10 to 101 kPa, further preferably from 20 to 90 kPa, most preferably from 30 to 90 kPa. When the pressure of the gas phase 51 in the closed container 10 falls within the above range, energy to be supplied to respective devices such as the heat exchanger can be reduced, and thereby the production cost can be suppressed.

The temperature of the liquid phase 50 in the closed container 10 is controlled by the jacket heater 13. The jacket heater 13 is controlled by the thermometer 14, the temperature controlling device 15 and the mixer 16. It is necessary to control the temperature of the liquid phase 50 so that the liquid phase 50 would not boil. The temperature of the liquid phase 50 is lower than the boiling point of water in the gas phase 51, preferably at most the boiling point (hereinafter referred to as "Tbp° C.") of the water type medium in the gas phase 51, more preferably lower than Tbp° C. When the temperature is at most the above temperature, the generation of bubbles in the closed container 10 can be suppressed.

The boiling point of the water type medium is calculated from the composition ratio of the water type medium, the vapor pressure, etc. Specifically, it is described in the after mentioned examples.

Further, the temperature of the liquid phase 50 in the closed container 10 is preferably at least (Tbp−50)° C., more preferably at least (Tbp−30)° C., most preferably at least (Tbp−10)° C. When the temperature is at least the above temperature, the production cost can be suppressed.

The pressure in the external circulating system 20 is controlled by the circulating pump 23, the pressure gauge 71 in the pressure controlling means 25, the pressure controlling device 72 and the pressure controlling valve 73.

The pressure in the external circulating system 20 is not particularly restricted, so long as the pressure is higher than the pressure in the closed container 10. The difference ΔP between the pressure in the external circulating system 20 and the pressure in the closed container 10 ((in the external circulating system)−(in the closed container)) is preferably from 10 kPa to 1,000 kPa, more preferably from 20 kPa to 500 kPa, most preferably from 30 kPa to 300 kPa.

The temperature of the mixed liquid 41 in the external circulating system 20 is controlled by the heat exchanger 24. The heat exchanger 24 is controlled by the thermometer 61, the temperature controlling device 62 and the mixer 63. In the present specification, the temperature of the mixed liquid 41 in the external circulating system 20 means the temperature of the mixed liquid 41 at the vicinity of the exit of the heat exchanger 24.

The temperature of the mixed liquid 41 in the external circulating system 20 is at least the boiling point of the hydrophilic organic solvent in the gas phase 51 in the closed container 10, preferably at least Tbp° C., more preferably (Tbp+2)° C., further preferably at least (Tbp+5)° C., most preferably at least (Tbp+7)° C. When the temperature is at least the above temperature, the hydrophilic organic solvent easily evaporates.

The temperature of the mixed liquid 41 in the external circulating system 20 is preferably lower than the boiling point of water in the gas phase 51 in the closed container 10, more preferably at most the boiling point of the water type medium in the external circulating system 20. When the temperature is at most the above temperature, the evaporation of water can be suppressed.

The mixed liquid 41 in the external circulating system 20 is discharged from the liquid inlet 22 at the upper part of the closed container 10 into the gas phase 51 in the closed container 10.

As a nozzle used for the liquid inlet 22, a known one used for discharging liquid into a container may be used. Particularly, a nozzle which discharges liquid in the form of small droplets is preferred, and a nozzle which can spray liquid is more preferred. By discharging or spraying the mixed liquid 41 in the form of small droplets into the gas phase 51 in the closed container 10, the hydrophilic organic solvent in the mixed liquid 41 can easily evaporate.

The gas phase 51 in the closed container is discharged through the gas outlet 30 by a vacuum pump installed at a downstream side of the gas outlet 30. The gas phase 51 is discharged to the outside of the closed container 10, whereby the hydrophilic organic solvent is removed. The removed hydrophilic organic solvent is recovered by a collector installed at a downstream side of the gas outlet 30.

Now, the way to operate the aqueous liquid-production apparatus 1 will be described below.

If the solvent is continuously removed, the composition of the liquid phase 50 in the closed container gradually changes. That is, the concentration of the hydrophilic organic solvent in the liquid phase 50 gradually decreases, and the amount of the evaporated hydrophilic organic solvent decreases. The operation method for continuing to remove the hydrophilic organic solvent may, for example, be the following method 1 and the following method 2.

Method 1: The pressure of the gas phase 51 in the closed container 10 is kept at almost constant, and the temperature of the mixed liquid 41 in the external circulating system 20 is raised, depending on the change of the composition of water and the hydrophilic organic solvent.

Method 2: The temperature of the liquid phase 50 in the closed container 10 is kept at almost constant, and the pressure of the gas phase 51 is reduced, depending on the change of the composition of water and the hydrophilic organic solvent.

In the method for producing an aqueous liquid of the present invention, the hydrophilic organic solvent in the mixed liquid is removed, until the content of the hydrophilic organic solvent in an aqueous liquid to be obtained becomes at most 1 mass %, per the total amount (100 mass %) of water and the hydrophilic organic solvent. The hydrophilic organic solvent in the mixed liquid is preferably removed, until the content of the hydrophilic organic solvent in the aqueous liquid becomes at most 0.1 mass %. The content of the hydrophilic organic solvent in the total amount (100 mass %) of water and the hydrophilic organic solvent in the aqueous liquid is preferably at least 10 ppm from the viewpoint of productivity.

(Method for Producing Water/Oil Resistant Agent)

The water/oil resistant agent of the present invention is produced by adjusting an aqueous liquid produced by the method for producing an aqueous liquid of the present invention. Here, "adjusting" includes any adjusting, so long as the vinyl polymer A-containing aqueous liquid may be used as raw material for the water/oil resistant agent. The adjusting also includes a case where the vinyl polymer A-containing aqueous liquid is used as the water-oil resistant agent as it is. As the adjusting, adjusting to dilute the vinyl polymer A-containing aqueous liquid with water so as to be the predetermined concentration is preferred. The water/oil resistant agent can be easily produced by such a method.

Objects with which the produced water/oil resistant agent is used are not particularly restricted, so long as the water/oil resistant effect is desired. For example, the water/oil resistant agent may be used as a component of the water/oil resistant agent for imparting the water durability and the oil durability to base materials such as wrapping paper for food products, paper used as a packing container for food products, a film, fibers, non-woven fabric, stone material and building materials such as concrete. Further, by treating the substrate with the produced water/oil resistant agent, the water/oil resistant material can be obtained.

(Function and Effect)

According to the present invention, the yield of the vinyl polymer A is high, and thereby the method for producing a vinyl polymer A-containing aqueous liquid, which is excellent in the production efficiency, can be provided.

In the water/oil resistant agent comprising the vinyl polymer A-containing aqueous liquid produced by the present invention, the hydrophilic organic solvent is sufficiently removed, whereby it can be used to wrapping paper for food products, a packaging container for food products, etc.

EXAMPLES

The vinyl polymer A used in Examples 1 to 3 and Comparative Example 1 was prepared in accordance with the monomer composition mentioned in the following Table 1. Further, the following are monomers mentioned in Table 1.

(Monomer (a))
  C6FMA: 3,3,4,4,5,5,6,6,7,7,8,8,8-tridecafluorooctyl methacrylate (Monomer (b))
  DEAEMA: N,N-diethylaminoethyl methacrylate
  MA: Methacrylic acid
  IA: Itaconic acid (Monomer (c))
  3-ED: Triethylene glycol dimethacrylate
  HEMA: 2-Hydroxyethyl methacrylate

TABLE 1

|  | Composition of vinyl polymer A (molar ratio) |
| --- | --- |
| Example 1 | C6FMA/3-ED/HEMA/DEAEMA (76.0/0.85/11.15/12.0) |
| Comparative Example 1 | C6FMA/3-ED/HEMA/DEAEMA (76.0/0.85/11.15/12.0) |
| Example 2 | C6FMA/3-ED/HEMA/DEAEMA (76.0/0.1/8.9/15.0) |
| Example 3 | C6FMA/HEMA/MA/IA (77/13/7.5/2.5) |

Example 1

As illustrated in FIG. 1, an aqueous liquid-production apparatus was produced by connecting a 5 L-glass tank, an external circulating system, a circulating pump, a heat exchanger, a pressure-controlling means, a gas outlet, etc.

Monomers were polymerized in acetone to prepare a liquid having 448 g of a vinyl polymer A mentioned in Table 1 dissolved or dispersed in 1,008 g of acetone, followed by mixing with an acetic acid aqueous solution having 28 g of acetic acid dissolved in 1,316 g of water to prepare a mixed liquid. The obtained mixed liquid was poured into the glass tank, the glass tank was heated by a jacket heater so that the temperature in the glass tank would be 45° C., and the pressure in the glass tank was controlled at 50 kPa. The circulating pump was turned on, and the circulating rate was set to 5 L/min, and the mixed liquid was discharged from the liquid outlet at the bottom part of the glass tank. The pressure in the external circulating system was controlled so as to be 100 kPa. The mixed liquid in the external circulating system was controlled at 54° C., and the mixed liquid was discharged from the liquid inlet at the upper part of the glass tank into the glass tank. A part of the gas phase in the glass tank was discharged from the gas outlet by the vacuum pump. While the operation, the temperature of the glass tank and the temperature of the external circulating system were raised, depending on the change of the composition of water and acetone in the mixed liquid. The operation was terminated, when the concentration of acetone in the glass tank became at most 0.1 mass %.

Each condition in Example 1, the time from the initiation of the operation until the concentration of the acetone in the glass tank became at most 0.1 mass % and the presence or absence of bubbles in the operation are mentioned in the following Table 2.

Comparative Example 1

An aqueous liquid-production apparatus was produced by connecting a 5 L-glass tank and a gas outlet. The above mentioned monomers were polymerized in acetone to prepare a liquid having a vinyl polymer A mentioned in Table 1 dissolved or dispersed in acetone. Using the liquid and an acetic acid aqueous liquid, a mixed liquid having the composition mentioned in Table 2 was prepared. The mixed liquid was poured into the glass tank, the glass tank was heated by a jacket heater so that the temperature in the glass tank would be 45° C. by a jacket heater, and the pressure in the glass tank was controlled at 50 kPa. The temperature in the glass tank was gradually raised, and the heating was stopped when bubbles were observed in the operation. After the generation of bubbles stopped, the heating was resumed to remove acetone. The reaction was terminated, when the concentration of acetone in the glass tank became at most 0.1 mass %.

Each condition in Comparative Example 1, the time from the initiation of the operation until the concentration of acetone in the glass tank became at most 0.1 mass %, the presence or absence of bubbles in the operation are mentioned in Table 2.

Example 2

The above mentioned monomers were polymerized in acetone to prepare a liquid having the vinyl polymer A mentioned in Table 1 dissolved or dispersed in acetone. Using the liquid and an acetic acid aqueous solution, a mixed liquid having the composition mentioned in Table 2 was prepared. The mixed liquid was poured into the glass tank of the same aqueous liquid-production apparatus as in Example 1, and the operation was carried out under conditions mentioned in Table 2 such as the temperature, the pressure, etc. In the same manner as in Example 1, the operation was carried out by raising the temperature in the glass tank and the temperature of the external circulating system, depending on the change of the composition of water and acetone in the mixed liquid.

Each condition in Example 2, the time from the initiation of the operation until the concentration of acetone in the glass tank became at most 0.1 mass % and the presence or absence of bubbles in the operation are mentioned in Table 2.

Example 3

The above mentioned monomers were polymerized in acetone to prepare a liquid having the vinyl polymer A mentioned in Table 1 dissolved or dispersed in acetone. Using the liquid and a sodium hydroxide aqueous solution having sodium hydroxide dissolved in water, a mixed liquid having the composition mentioned in Table 2 was prepared. The mixed liquid was poured into the glass tank of the same aqueous liquid-production apparatus as in Example 1, and the operation was carried out under conditions shown in Table 2 such as the temperature, the pressure, etc. In the operation, depending on the change of the composition of water and acetone in the mixed liquid, the pressure in the glass tank and the pressure in the external circulating system were reduced.

Each condition in Example 3, the time from the initiate until the concentration of acetone in the glass tank became at most 0.1 mass % and the presence or absence of bubbles in the operation are mentioned in Table 2.

Further, "→" in Table 2 means that the condition was changed in the operation. For example, "45→75" at the temperature in the glass tank in Example 1 means that the operation was started at 45° C., and the temperature was raised to 75° C.

Further, "-" in Table 2 means that the operation was carried out under condition in a specific range. For example, "66-70" at the temperature in the glass tank in Example 3 means that the operation is carried out within the temperature range of from 66 to 70° C.

TABLE 2

| | | Example 1 | Comparative Example 1 | Example 2 | Example 3 |
|---|---|---|---|---|---|
| Mixed amount (g) | Acetone (Hydrophilic organic solvent) | 1008 | 1022 | 562 | 538 |
| | Water | 1316 | 1330 | 2206 | 2338 |
| | Vinyl polymer A | 448 | 448 | 610 | 423 |
| | Acetic acid | 28 | 28 | 120 | 0 |
| | Potassium hydroxide | 0 | 0 | 0 | 180 |
| Pressure (kPa) | In the glass tank | 50 | 50 | 50 | 90→33 |
| | In the external circulating system | 100 | — | 100 | 140→83 |
| Temperature (° C.) | In the glass tank | 45→75 | 45→82 | 40→79 | 66-70 |
| | In the external circulating system | 54→95 | — | 57→94 | 78-80 |
| Boiling point of mixed liquid (° C.) | In the glass tank | 47→81 | 47→81 | 56→81 | 71-72 |
| | In the external circulating system | 66→100 | — | 75→100 | 88-96 |

TABLE 2-continued

|  | Example 1 | Comparative Example 1 | Example 2 | Example 3 |
| --- | --- | --- | --- | --- |
| Circulation rate (L/min) | 5 | — | 5 | 5 |
| ΔP (kPa) (In the external circulating system-in the glass tank) | 50 | — | 50 | 50 |
| Time | 8 | 11 | 10 | 6 |
| Bubbles | Not | Present | Not | Not |

It is evident from Table 2 that bubbles were not observed in Examples 1, 2, and 3, unlike Comparative Example 1, and thereby the vinyl polymer A was considered not to be lost. Further, it is possible to produce an aqueous liquid in short time.

INDUSTRIAL APPLICABILITY

The present invention is useful to efficiently remove a hydrophilic organic solvent from a mixed liquid containing the vinyl polymer A, the hydrophilic organic solvent and water. Further, the vinyl polymer A-containing aqueous liquid to be obtained by the present invention is preferably used as a component for a water/oil resistant agent.

This application is a continuation of PCT Application No. PCT/JP2016/055697, filed on Feb. 25, 2016, which is based upon and claims the benefit of priority from Japanese Patent Application No. 2015-036915 filed on Feb. 26, 2015. The contents of those applications are incorporated herein by reference in their entireties.

REFERENCE SYMBOLS

1: Aqueous liquid-production apparatus, 10: closed container, 11: power motor, 12: stirrer, 13: jacket heater, 14: thermometer, 15: temperature controlling device, 16: mixer, 20: external circulating system, 21: liquid outlet, 22: liquid inlet, 23: circulating pump, 24: heat exchanger, 25: pressure controlling means, 30: gas outlet, 31: pressure gauge, 32: pressure controlling device, 33: pressure controlling valve, 40: mixed liquid, 41: mixed liquid, 50: liquid phase, 51: gas phase, 61: thermometer, 62: temperature controlling device, 63: mixer, 71: pressure gauge, 72: pressure controlling device, 73: pressure controlling valve

What is claimed is:

1. A production method of a vinyl polymer aqueous liquid, the production method comprising:
   filling a closed container having a gas outlet with a mixed liquid containing water and a hydrophilic organic solvent with a boiling point of lower than 10020 C., wherein a vinyl polymer having hydrophobic groups and hydrophilic groups is dissolved or dispersed, to form a liquid phase and a gas phase;
   forming a part of the liquid of the liquid phase into small droplets;
   bringing the small droplets into contact with the gas phase to vaporize the hydrophilic organic solvent in the small droplets; and
   removing the gas of the gas phase containing the vaporized hydrophilic organic solvent from the gas outlet of the closed container, whereby the amount of the hydrophilic organic solvent in the liquid phase is reduced to at most 1 mass % per the total amount of the hydrophilic organic solvent and water.

2. The production method according to claim 1, wherein the closed container has a circulating system to take out a part of the liquid of the liquid phase and control the temperature of the taken out liquid to form it into small droplets and to discharge them in the gas phase.

3. The production method according to claim 2, wherein the closed container has a liquid outlet to discharge the liquid of the liquid phase and a liquid inlet to introduce the liquid to the gas phase, the circulating system is an external circulating system formed between the liquid outlet and the liquid inlet, and
   the production method further comprises controlling the temperature and the pressure of the liquid flowing in the external circulating system.

4. The production method according to claim 1, wherein the pressure of the gas phase is at most atmospheric pressure, the temperature of the liquid of the liquid phase is lower than the boiling point of water in the gas phase, and the temperature of the liquid to be formed into small droplets and brought into contact with the gas phase is at least the boiling point of the hydrophilic organic solvent and lower than the boiling point of water.

5. The production method according to claim 1, wherein the amount of water in the mixed liquid is at least 50 mass % per the total amount of water and the hydrophilic organic solvent, and in a case where water and the hydrophilic organic solvent have an azeotropic point, the amount of water is water excessive than the azeotropic composition.

6. The production method according to claim 1, wherein the temperature of the liquid of the liquid phase is maintained to be substantially constant, and the removal of the hydrophilic organic solvent is continued, while reducing the pressure of the gas phase in accordance with the change of the composition of water and the hydrophilic organic solvent.

7. The production method according to claim 2, wherein the pressure of the gas phase is maintained to be substantially constant, and the removal of the hydrophilic organic solvent is continued, while increasing the temperature of the liquid in the circulating system in accordance with the change of the composition of water and the hydrophilic organic solvent.

8. The production method according to claim 1, wherein the hydrophilic organic solvent is acetone, methyl ethyl ketone or 2-propanol.

9. The production method according to claim 1, wherein the hydrophobic groups are polyfluoroalkyl groups.

10. The production method according to claim 1, wherein the hydrophilic groups are acidic groups or basic groups.

11. The production method according to claim 1, wherein the hydrophilic groups are neutralized acidic groups or neutralized basic groups.

12. The production method according to claim 11, wherein the mixed liquid is a mixed liquid which comprises an aqueous solution containing a basic substance, and a hydrophilic organic solvent solution containing a vinyl polymer obtained by copolymerizing in a hydrophilic organic soluvent, a vinyl monomer mixture containing a vinyl monomer having a carboxyl group and a vinyl monomer having a polyfluoroalkyl group.

13. The production method according to claim 11, wherein the mixed liquid is a mixed liquid which comprises an aqueous solution containing an acidic substance, and a hydrophilic organic solvent solution containing a vinyl polymer obtained by copolymerizing in a hydrophilic organic solvent, a vinyl monomer mixture containing a vinyl monomer having a dialkyl amino group and a vinyl monomer having a polyfluoroalkyl group.

14. A method for producing a water/oil resistant agent, the method comprising:
   producing the vinyl polymer aqueous liquid by the production method as defined in claim 1; and
   preparing a water/oil resistant agent from the aqueous liquid.

15. A method for producing a water/oil resistant substrate, the method comprising:
   treating a substrate with the water/oil resistant agent obtained by the method as defined in claim 14.

* * * * *